US012551789B2

(12) United States Patent
Cao et al.

(10) Patent No.: US 12,551,789 B2
(45) Date of Patent: Feb. 17, 2026

(54) METHOD FOR OPERATING RUNNING-TYPE SOMATOSENSORY GAME

(71) Applicant: Shenzhen Shimi Network Technology Co., Ltd., Shenzhen (CN)

(72) Inventors: Qianfu Cao, Shenzhen (CN); Jun Li, Shenzhen (CN)

(73) Assignee: Shenzhen Shimi Network Technology Co., Ltd., Shenzhen (CN)

( * ) Notice: Subject to any disclaimer, the term of this patent is extended or adjusted under 35 U.S.C. 154(b) by 323 days.

(21) Appl. No.: 18/195,908

(22) Filed: May 10, 2023

(65) Prior Publication Data

US 2024/0131426 A1 Apr. 25, 2024
US 2024/0226733 A9 Jul. 11, 2024

(30) Foreign Application Priority Data

Oct. 24, 2022 (CN) ......................... 202211302467.2

(51) Int. Cl.

*A63F 13/428* (2014.01)
*A63F 13/2145* (2014.01)
*A63F 13/56* (2014.01)
*A63F 13/79* (2014.01)

(52) U.S. Cl.

CPC ........ *A63F 13/428* (2014.09); *A63F 13/2145* (2014.09); *A63F 13/56* (2014.09); *A63F 13/79* (2014.09)

(58) Field of Classification Search

None

See application file for complete search history.

(56) References Cited

U.S. PATENT DOCUMENTS

2005/0049022 A1* 3/2005 Mullen .................. A63F 13/79 463/1
2017/0122769 A1* 5/2017 Martin ..................... G01P 7/00

* cited by examiner

*Primary Examiner* — Lawrence S Galka
(74) *Attorney, Agent, or Firm* — IPro, PLLC

(57) ABSTRACT

Disclosed herein are a method, apparatus and device for operating a running-type somatosensory game, and a computer-readable storage medium. The method comprises: after a preset running-type somatosensory game is started, mapping an operation button on a touch display module of a paired somatosensory device, the operation button comprising an acceleration button; acquiring somatosensory data and button operation data from the somatosensory device; performing a running operation according to the somatosensory data, and accumulating acceleration energy according to the somatosensory data; and when the acceleration energy reaches a set value, if operation data of the acceleration button is received from the somatosensory device, performing an acceleration operation. The running-type somatosensory game method of the present disclosure has the advantages of strong operability, low game cost, high game freedom, good gaming experience, etc.

21 Claims, 5 Drawing Sheets

METHOD FOR OPERATING RUNNING-TYPE SOMATOSENSORY GAME

TECHNICAL FIELD

The present disclosure relates to the technical field of somatosensory games, and in particular, to a method, apparatus and device for operating a running-type somatosensory game, and a computer-readable storage medium.

BACKGROUND

Somatosensory games refer to games that rely on somatosensory devices to collect motion data of users, and then control game characters based on the motion data. The advantage of this game method is that a user needs to participate in motion during the game, the user has a stronger sense of participation, and it is helpful to protect the user's health.

However, a problem with traditional somatosensory games is that, because somatosensory data is used to control the motion of game characters, some non-motion-related functions, such as shooting and prop throwing, cannot be realized through somatosensory data. At present, these non-motion-related functions are usually realized by a specific somatosensory gamepad. However, using the specific gamepad not only increases the user's game cost, but also limits the temporal spontaneity and freedom of the game.

SUMMARY

Embodiments of the present disclosure provide a method for operating a somatosensory running game, which aims to reduce the game cost of the running-type somatosensory game while improving the playability of the running-type somatosensory game.

In order to achieve the above objective, the embodiments of the present disclosure provide a method for operating a running-type somatosensory game, comprising:

after a preset running-type somatosensory game is started, mapping an operation button on a touch display of a paired somatosensory device, the operation button comprising an acceleration button;

acquiring somatosensory data and button operation data from the somatosensory device;

performing a running operation according to the somatosensory data, and accumulating acceleration energy according to the somatosensory data; and when the acceleration energy reaches a set value, if operation data of the acceleration button is received from the somatosensory device, performing an acceleration operation.

In an embodiment, accumulating the acceleration energy according to somatosensory data comprises:

calculating the number of arm swings of a user according to the somatosensory data; and accumulating the acceleration energy according to the number of arm swings.

In an embodiment, the operating method further comprises:

before performing the acceleration operation, determining a running speed of a game character in a current acceleration operation according to historical somatosensory data.

In an embodiment, the historical somatosensory data is somatosensory data during a period when the acceleration energy is accumulated from 0 to a set value.

In an embodiment, determining the running speed of the game character in the current acceleration operation according to the historical somatosensory data comprises:

calculating an average speed according to a speed parameter in the historical somatosensory data; and determining the running speed of the game character in the current acceleration operation according to the average speed.

In an embodiment, calculating the average speed according to the speed parameter in the historical somatosensory data comprises:

deleting a maximum speed parameter and a minimum speed parameter in the historical somatosensory data; and calculating the average speed according to the deleted historical somatosensory data.

In an embodiment, the operation button further comprises a prop throwing button, and the method further comprises:

if operation data of the throwing button is received from the somatosensory device, performing a set acceleration operation.

In order to achieve the above objective, the embodiments of the present disclosure further propose an operation apparatus for a running-type somatosensory game, comprising:

a button mapping module configured to, after a preset running-type somatosensory game is started, map an operation button on a touch display of a paired somatosensory device, the operation button comprising an acceleration button;

a data acquisition module configured to acquire somatosensory data and button operation data from the somatosensory device;

a running operation module configured to perform a running operation according to the somatosensory data, and to accumulate acceleration energy according to the somatosensory data; and an acceleration operation module configured to, when the acceleration energy reaches a set value, if operation data of the acceleration button is received from the somatosensory device, perform an acceleration operation.

In order to achieve the above objective, the embodiments of the present disclosure further propose a device for operating a running-type somatosensory game, comprising: a memory, a processor, and an operating program of a running-type somatosensory game that is stored on the memory and can run on the processor, wherein when the processor executes the operating program of the running-type somatosensory game, any one of the methods for operating the running-type somatosensory game described above is implemented.

In order to achieve the above objective, the embodiments of the present disclosure further propose a computer-readable storage medium, wherein an operating program of a running-type somatosensory game is stored on the computer-readable storage medium, and when the operating program of the running-type somatosensory game is executed by a processor, any one of the methods for operating the running-type somatosensory game described above is implemented.

According to the method for operating the running-type somatosensory game in the technical solution of the present disclosure, when playing a game, the shooting button is mapped on the touch display of the somatosensory device. In this way, during the game, the running operation may be performed according to the somatosensory data, and the acceleration operation may be performed according to the button operation data, so that the somatosensory control and button control can be realized at the same time with conventional somatosensory devices. Therefore, even ordinary somatosensory devices, such as smart watches and smart bracelets, can be used to input button instructions, so that no specific somatosensory game device is required, which can greatly reduce the user's game cost, and improve the temporal spontaneity and freedom of the game. Moreover, the acceleration of data accumulation based on somatosensory data will also help to further improve the operability of the game and the user's sense of immersion. It can be seen that compared with the traditional running-type somatosensory game method, the running-type somatosensory game method of the present disclosure has the advantages of strong operability, low game cost, high game freedom, good gaming experience, etc.

Figure 1:
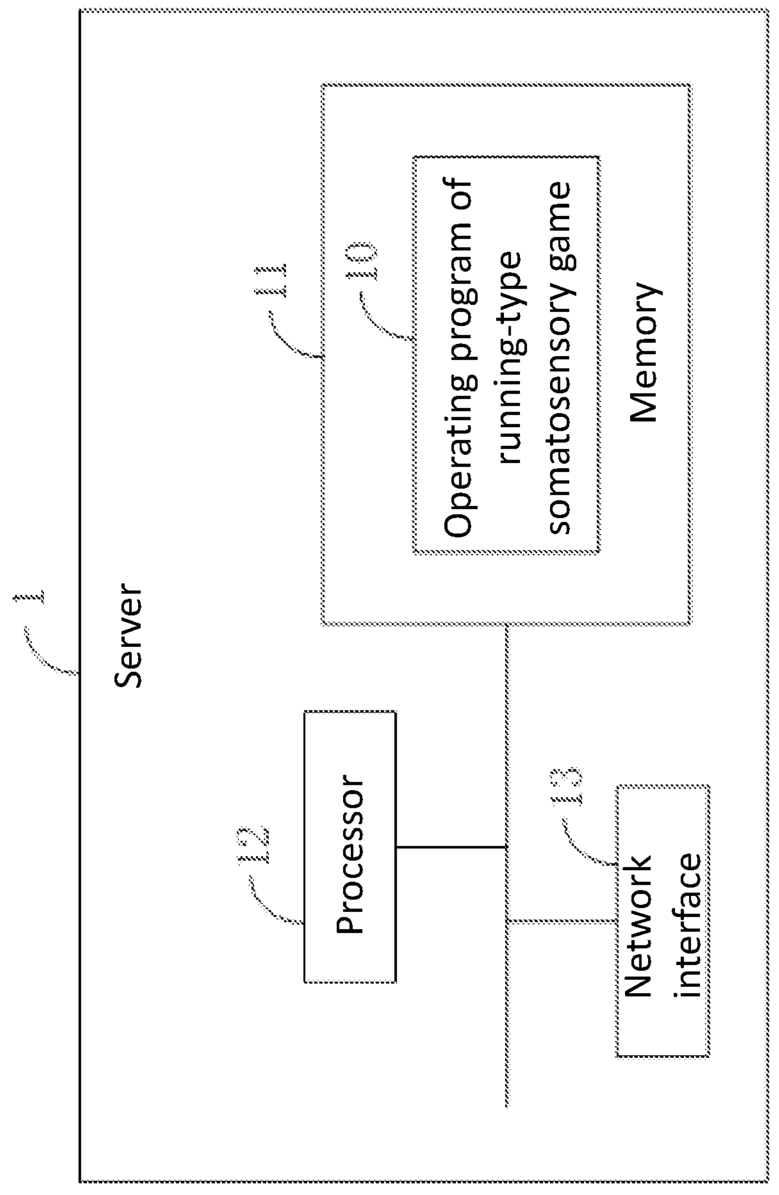
FIG. 1 is a module structural diagram of a device for operating a running-type somatosensory game according to an embodiment of the present disclosure.

The implementation, functional features and advantages of the objective of the present disclosure will be further described with reference to the drawing.

DETAILED DESCRIPTION

It should be understood that specific embodiments described herein are only used to explain the present disclosure and are not used to limit the present disclosure.

In order to better understand the above technical solutions, exemplary embodiments of the present disclosure will be described in more detail below with reference to the drawings. While the exemplary embodiments of the present disclosure have been shown in the drawings, it should be understood that the present disclosure may be implemented in various forms and should not be limited by the embodiments set forth herein. Rather, these embodiments are provided so that the present disclosure can be understood more thoroughly, and the scope of the present disclosure can be fully conveyed to those skilled in the art.

It should be noted that, in the claims, any reference signs placed between parentheses shall not be construed as limiting the claims. The words "comprising" or "comprises" herein do not exclude the presence of components or steps not listed in the claims. The indefinite article "a" or "an" preceding a component does not exclude the presence of a plurality of such components. The present disclosure can be implemented by means of hardware comprising several different components, and a suitably programmed computer. In a unit claim enumerating several means, several of these means can be embodied by the same item of hardware. Moreover, the use of "first," "second," and "third," etc. does not imply any order, and these words may be construed as designations.

As shown in FIG. 1, FIG. 1 is a schematic structural diagram of a server 1 (also called a device for operating a running-type somatosensory game) in a hardware running environment involved in a solution of an embodiment of the present disclosure.

The server of the embodiment of the present disclosure is, for example, an "Internet of Things device", a smart air conditioner with a networking function, a smart light, a smart power supply, an AR/VR device with a networking function, a smart speaker, a self-driving car, a PC, a smart phone, a tablet computer, an e-book reader, a portable computer, or other devices with display functions.

As shown in FIG. 1, the server 1 comprises a memory 11, a processor 12 and a network interface 13.

The memory 11 comprises at least one type of readable storage medium, and the readable storage medium comprises a flash memory, a hard disk, a multimedia card, a card-type memory (e.g., an SD or DX memory, etc.), a magnetic memory, a magnetic disk, an optical disk or the like. In some embodiments, the memory 11 may be an internal storage unit of the server 1, such as a hard disk of the server 1. In other embodiments, the memory 11 may also be an external storage device of the server 1, such as a plug-in hard disk equipped on the server 1, a smart media card (SMC), a secure digital (SD) card, a flash card or the like.

Further, the memory 11 may also comprise an internal storage unit and an external storage device of the server 1. The memory 11 can not only be used to store application software and various data installed on the server 1, such as codes of an operating program 10 of the running-type somatosensory game, but also can be used to temporarily store data that has been output or will be output.

In some embodiments, the processor 12 may be a central processing unit (CPU), a controller, a microcontroller, a microprocessor or other data processing chips, and used to run program codes or processing data stored in the memory 11, such as a operating program 10 for executing a running-type somatosensory game, etc.

The network interface 13 may optionally comprise a standard wired interface and a wireless interface (such as a WI-FI interface), and is generally used to establish communication connections between the server 1 and other electronic devices.

The network may be the Internet, a cloud network, a wireless fidelity (Wi-Fi) network, a personal network (PAN), a local area network (LAN) and/or a metropolitan area network (MAN). Various devices in a network environment may be configured to connect to a communication network according to various wired and wireless communication protocols. Examples of such wired and wireless communication protocols may include, but are not limited to, at least one of the following: Transmission Control Protocol and Internet Protocol (TCP/IP), User Datagram Protocol (UDP), Hypertext Transfer Protocol (HTTP), file transfer Protocol (FTP), ZigBee, EDGE, IEEE 802.11, Optical Fidelity (Li-Fi), 802.16, IEEE 802.11s, IEEE 802.11g, multi-hop communication, wireless access point (AP), device-to-device communication, cellular communication protocol and/or Bluetooth (Blue Tooth) communication protocol, or a combination thereof.

Optionally, the server may further comprise a user interface. The user interface may include a display and an input unit such as a keyboard. Optional user interfaces may also include standard wired interfaces and wireless interfaces. Optionally, in some embodiments, the display may be an LED display, a liquid crystal display, a touch-sensitive liquid crystal display, an organic light-emitting diode (OLED) touch device, or the like. The display may also be referred to as a display screen or a display unit, and is used to display information processed in the server 1 and to display a visualized user interface.

FIG. 1 only shows the server 1 with components 11-13 and the operating program 10 of the running-type somatosensory game. It can be understood by those skilled in the art that the structure shown in FIG. 1 does not form a limitation of the server 1, and may comprise fewer or more components than shown, or combinations of certain components, or different arrangements of components.

In this embodiment, the processor 12 may be used to call the operating program of the running-type somatosensory game stored in the memory 11, and perform the following operations:

after a preset running-type somatosensory game is started, mapping an operation button on a touch display of a paired somatosensory device, the operation button comprising an acceleration button;

acquiring somatosensory data and button operation data from the somatosensory device;

performing a running operation according to the somatosensory data, and accumulating acceleration energy according to the somatosensory data; and when the acceleration energy reaches a set value, if operation data of the acceleration button is received from the somatosensory device, performing an acceleration operation.

In an embodiment, the processor 12 may be used to call the operating program of the running-type somatosensory game stored in the memory 11, and perform the following operations:

when the acceleration energy is accumulated according to somatosensory data:

calculating the number of arm swings of a user according to the somatosensory data; and accumulating the acceleration energy according to the number of arm swings.

In an embodiment, the processor 12 may be used to call the operating program of the running-type somatosensory game stored in the memory 11, and perform the following operations:

before performing the acceleration operation, determining a running speed of a game character in a current acceleration operation according to historical somatosensory data.

In an embodiment, the processor 12 may be used to call the operating program of the running-type somatosensory game stored in the memory 11, and perform the following operations:

acquiring the historical somatosensory data, which is somatosensory data during a period when the acceleration energy is accumulated from 0 to a set value.

In an embodiment, the processor 12 may be used to call the operating program of the running-type somatosensory game stored in the memory 11, and perform the following operations:

determining the running speed of the game character in the current acceleration operation according to the historical somatosensory data comprises:

calculating an average speed according to a speed parameter in the historical somatosensory data; and determining the running speed of the game character in the current acceleration operation according to the average speed.

In an embodiment, the processor 12 may be used to call the operating program of the running-type somatosensory game stored in the memory 11, and perform the following operations:

when the average speed is calculated according to the speed parameter in the historical somatosensory data:

deleting a maximum speed parameter and a minimum speed parameter in the historical somatosensory data; and calculating the average speed according to the deleted historical somatosensory data.

In an embodiment, the processor 12 may be used to call the operating program of the running-type somatosensory game stored in the memory 11, and perform the following operations:

when the operation button further comprises a prop throwing button:

if operation data of the throwing button is received from the somatosensory device, performing a set acceleration operation.

Based on the hardware structure of the device for operating the running-type somatosensory game, an embodiment of the method for operating the running-type somatosensory game of the present disclosure is proposed. The method for operating the running-type somatosensory game of the present disclosure aims to reduce the game cost of the running-type somatosensory game while improving the playability of the running-type somatosensory game.

Figure 2:
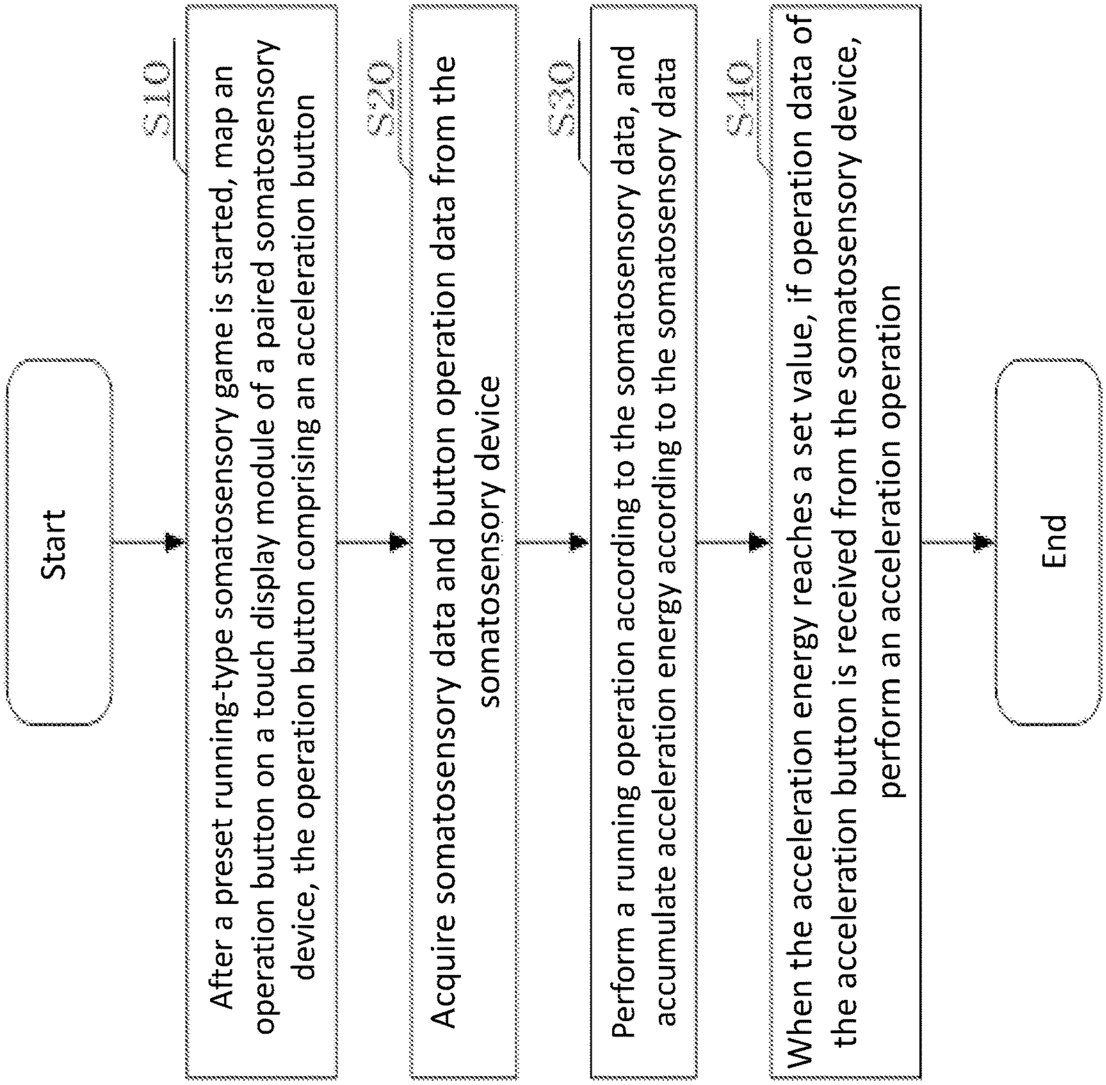
FIG. 2 is a schematic flowchart of a device for operating a running-type somatosensory game according to an embodiment of the present disclosure.

Referring to FIG. 2, FIG. 2 shows a method for operating the running-type somatosensory game according to an embodiment of the present disclosure. The method for operating the running-type somatosensory game comprises the following steps:

S10: After a preset running-type somatosensory game is started, map an operation button on a touch display of a paired somatosensory device, the operation button comprising an acceleration button.

The running-type somatosensory game refers to a somatosensory game that requires a player to control a game character to run. It may be a local application, or may be a small program based on HTML5, a web application or the like. Specifically, the somatosensory game runs on a terminal, and the terminal may be a desktop computer, a notebook computer, a game console, a portable game console, a smart phone, a tablet computer, a smart watch, a smart TV or the like.

A somatosensory device refers to a device capable of detecting a player's somatosensory data. Generally, the somatosensory device is set to comprise a six-axis IMU sensor, and the six-axis IMU sensor comprises a three-axis accelerometer and a three-axis gyroscope. The six-axis IMU sensor detects the player's somatosensory data by detecting changes in the player's three-axis acceleration and three-axis angular velocity. Specifically, the somatosensory device is set to be wearable, and its forms include but are not limited to the following: bracelets, watches, gamepads, smart phones, etc.

Furthermore, before the game, the somatosensory device needs to establish a communication connection with a terminal (that is, establish pairing with the terminal), wherein a wired connection or a wireless connection may be established between the somatosensory device and the terminal. For example, when the somatosensory device establishes a wired connection with the terminal, it may be based on at least one of USB2.0 protocol, USB3.0 protocol, Thunderbolt 3 protocol, and Thunderbolt 4 protocol; and when the somatosensory device establishes a wireless connection with the terminal, it may be based on at least one of Bluetooth protocol, WiFi protocol, infrared protocol, 2.4G communication protocol, and NFC protocol.

Specifically, in the technical solution defined in the present disclosure, the somatosensory device needs to have a touch display to display a graphical user interface required by the game. In addition to displaying the required graphical user interface, the touch display has a touch control function, so that users can input instructions by means of touch.

The acceleration button refers to a button corresponding to an acceleration operation in the running-type somatosensory game. Through the acceleration button, the user can input an acceleration instruction on the somatosensory device to implement the acceleration operation of the game character.

Specifically, when the user starts a running-type somatosensory game on the terminal, the terminal generates operation button data based on a preset operation button of the current somatosensory game, and then transmits the operation button data to the somatosensory device by means of communication. After the somatosensory device receives the operation button data, it displays a corresponding operation button on a corresponding touch display based on the operation button data. The preset operation button corresponds to a function that is difficult to achieve through somatosensory data in the somatosensory game. During the game, the users can trigger the operation buttons to achieve functions such as shooting, flying, prop throwing, etc. It is worth noting that, depending on the type of game or the content of the game, each somatosensory game is preset with a different quantity of operation buttons, and the running-type somatosensory game defined in the technical solution of the present disclosure is preset with an acceleration button.

It can be understood that in the technical solution of the present disclosure, corresponding operation buttons are mapped on the touch display of the somatosensory device according to the somatosensory game currently running on the terminal, so that the user can use a common somatosensory device (such as a smart watch, a smart bracelet or the like) to input specific control instructions without purchasing a specific gamepad, which can thus greatly reduce the user's game cost. Moreover, since there is no need to carry a gamepad, the user can play the game at any time, thereby improving the temporal spontaneity and freedom of the game. In addition, since the virtual operation buttons are mapped on the touch display, different button operations can be adaptively mapped according to different somatosensory games, so as to adapt to various types of somatosensory games and meet different use requirements.

S20: Acquire somatosensory data and button operation data from the somatosensory device.

The somatosensory data refers to posture data of the user collected by the somatosensory device, which includes three-axis acceleration data and three-axis angular velocity data. The button operation data refers to data when the user touches and operates a button.

Furthermore, when the terminal is running the somatosensory game, the somatosensory device can continuously send the somatosensory data and the button operation data to the terminal based on a communication protocol for establishing a communication connection with the terminal and a set sampling frequency.

For example, when pairing/establishing a communication connection between the somatosensory device and the terminal via the Bluetooth protocol, the somatosensory device will send sampling data to the terminal every 20 ms (it can also be understood as the somatosensory device sending sampling data to the terminal at a frequency of 50 Hz), the sampling data including the somatosensory data and the button operation data.

S30: Perform a running operation according to the somatosensory data, and acceleration energy is accumulated according to the somatosensory data.

The acceleration energy refers to a precondition required to perform an acceleration operation in the game. When the user is playing the game, the acceleration condition can only be executed after a certain amount of acceleration energy is accumulated. In other words, before the acceleration energy is accumulated enough, even if the user inputs an instruction for the acceleration operation, the game character cannot perform the acceleration operation.

Specifically, after receiving the somatosensory data transmitted by the somatosensory device, the terminal can obtain the user's motion/posture trajectory according to a posture algorithm such as an Euler angle algorithm, a direction cosine method, a quaternion algorithm or the like, and then acquire a corresponding game character running operation instruction according to the calculated motion/posture trajectory data. After the terminal sends the running operation instruction to the current running-type somatosensory game, the game performs a corresponding running operation. For example, the running direction, running speed and the like of the game character are controlled according to the somatosensory data. In addition, in the technical solution of the present disclosure, the acceleration energy required for the acceleration operation may also be accumulated according to the somatosensory data. In this way, the accumulation of accelerated energy can be implemented according to the user's motion performance. Compared with traditional games in which energy is acquired by collecting energy props, not only the operability of the game is stronger, but also the user's sense of game participation and immersion is stronger, which helps to further enhance the user's gaming experience.

S40: After the acceleration energy reaches a set value, if the operation data of the acceleration button is received from the somatosensory device, perform the acceleration operation.

Specifically, after the accumulation of acceleration energy is completed, if the user inputs an acceleration operation instruction through the acceleration button on the somatosensory device, the terminal will perform the acceleration operation to increase the running speed of the game character. It is worth noting that when the acceleration operation is performed, the running speed of the game character may be increased to a fixed speed, or the running speed of the game character may be increased according to a set factor.

It can be understood that according to the method for operating the running-type somatosensory game in the technical solution of the present disclosure, when playing a game, the shooting button is mapped on the touch display of the somatosensory device. In this way, during the game, the running operation can be performed according to the somatosensory data, and the acceleration operation can be performed according to the button operation data, so that the somatosensory control and button control can be realized at the same time with conventional somatosensory devices. Therefore, even ordinary somatosensory devices, such as smart watches and smart bracelets, can be used to input button instructions, so that no specific somatosensory game device is required, which can greatly reduce the user's game cost, and improve the temporal spontaneity and freedom of the game. Moreover, the acceleration of data accumulation based on somatosensory data will also help to further improve the operability of the game and the user's sense of immersion. It can be seen that compared with the traditional running-type somatosensory game method, the running-type somatosensory game method of the present disclosure has the advantages of strong operability, low game cost, high game freedom, good gaming experience, etc.

Figure 3:
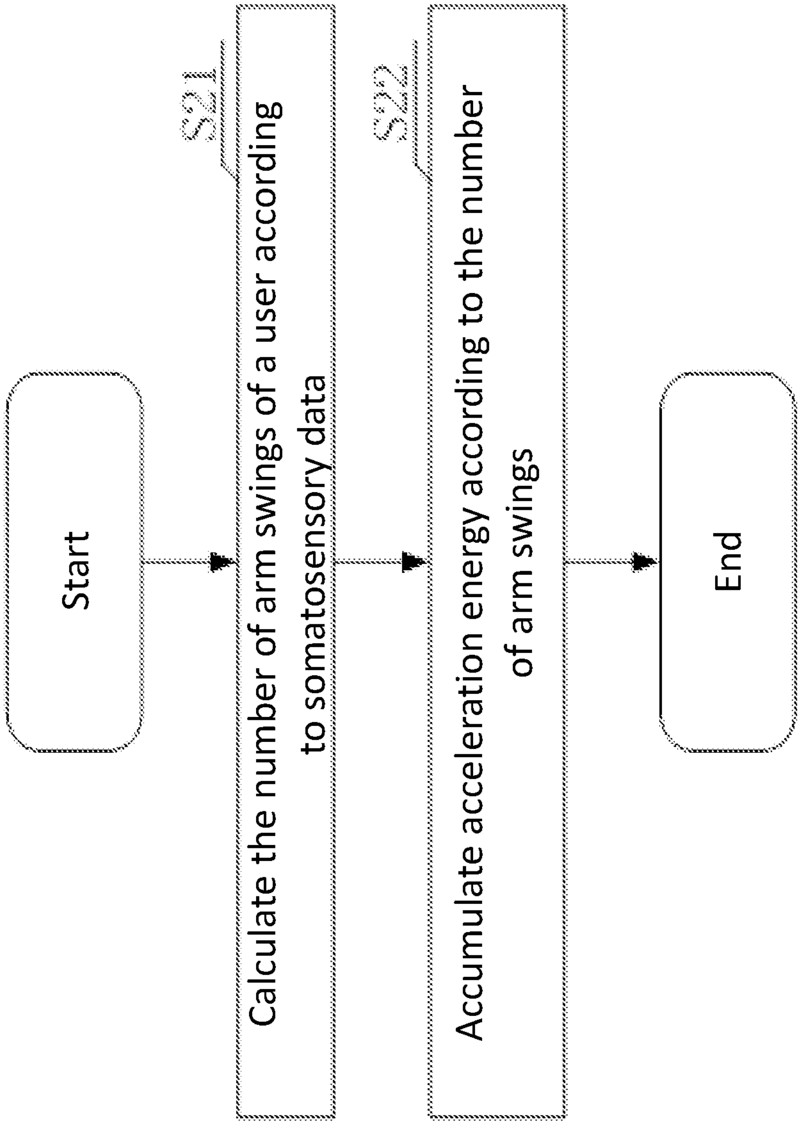
FIG. 3 is a schematic flowchart of a device for operating a running-type somatosensory game according to another embodiment of the present disclosure.

As shown in FIG. 3, in some embodiments, accumulating the acceleration energy according to somatosensory data comprises:

S21: Calculate the number of arm swings of the user according to the somatosensory data.

Specifically, since the user is required to perform an arm swing operation when playing the running-type somatosensory game, the somatosensory data collected by the somatosensory device is motion data when the user swings his arm(s). Then, based on the somatosensory data collected by the somatosensory device, the terminal can obtain the user's movement posture through the Euler angle algorithm and other posture algorithms, and then by setting a threshold, the terminal can calculate the number of arm swings of the user. It is worth noting that, since the user usually only wears/uses the somatosensory device with one hand, the calculated number of arm swings is the number of swings of the user's single arm.

S22: Accumulate the acceleration energy according to the number of arm swings.

Specifically, after the user's arm swing times are calculated, acceleration energy may be accumulated based on the arm swing times. Specifically, the number of arm swings of the user corresponds to a set energy value, so that the acceleration energy increases by a set energy value each time the user completes an arm swing action. In this way, the faster the user swings the arm, the faster the accumulation of acceleration energy will be.

It can be understood that in this way, the accumulation of acceleration energy can be carried out based on the number of arm swings of the user, and the accumulation of acceleration energy is positively correlated with the frequency of arm swings of the user. In this way, the user's enthusiasm for exercise can be stimulated, thereby enhancing the user's sense of participation in the game.

In some embodiments, the operating method further comprises:

before performing the acceleration operation, determining a running speed of a game character in a current acceleration operation according to historical somatosensory data.

Specifically, in this embodiment, when the acceleration operation is performed, the terminal will control the game character to run at a fixed speed, and the fixed speed is determined according to historical somatosensory data. In this way, the running speed of the game character in the accelerated state can be determined according to the user's exercise performance. Such a setting can enhance the influence of the user's exercise performance on the game, which is thus helpful to the user's sense of participation in the game.

For example, the better the user's exercise performance in the historical period, the faster the running speed in the current acceleration operation; conversely, the worse the user's exercise performance in the historical period, the slower the running speed in the current acceleration operation.

It can be understood that through the above operations, the running speed in the acceleration operation is linked to the user's exercise performance, so that the user's enthusiasm for exercise can be stimulated, thereby enhancing the user's sense of participation in the game.

In some embodiments, the historical somatosensory data is somatosensory data during a period when the acceleration energy is accumulated from 0 to a set value. Using the somatosensory data in the above time period as historical somatosensory data enables the accumulation speed of acceleration energy to be closer to the user's actual exercise performance. Of course, the design of the present disclosure is not limited thereto, and in other embodiments, a fixed time window may also be set to acquire the required historical somatosensory data. For example, the somatosensory data within 10 seconds before the acceleration operation is performed is set as the historical somatosensory data.

Figure 4:
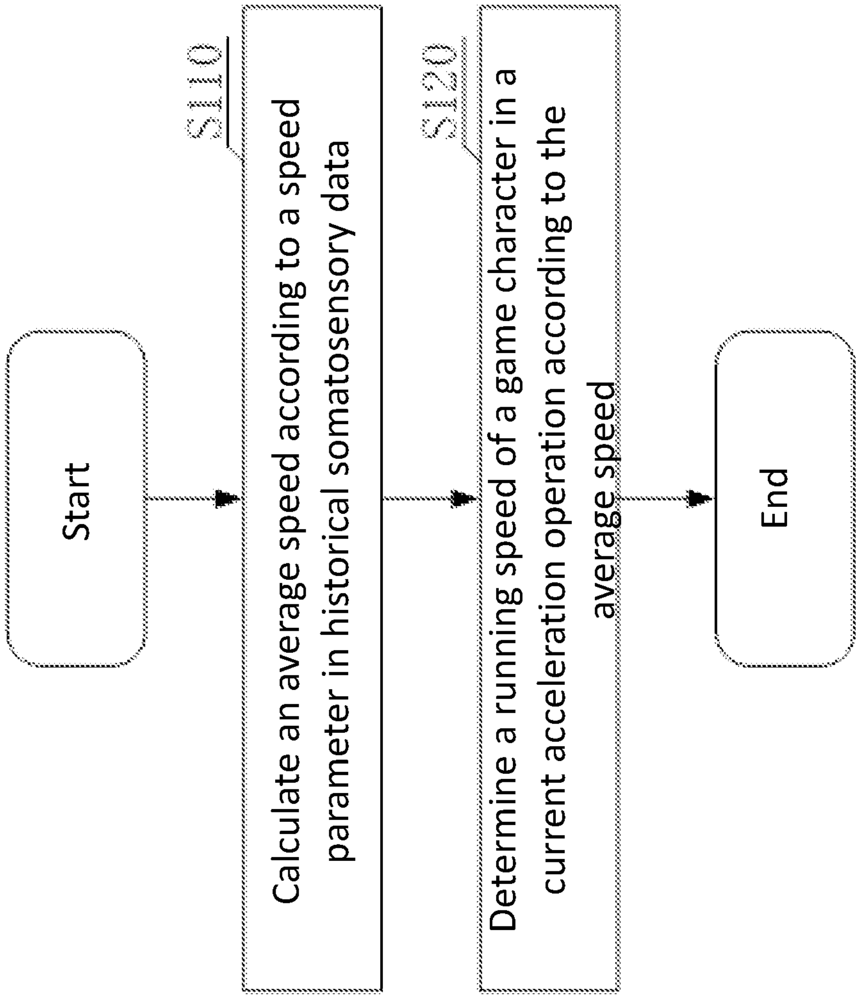
FIG. 4 is a schematic flowchart of a device for operating a running-type somatosensory game according to still another embodiment of the present disclosure.

As shown in FIG. 4, in some embodiments, determining the running speed of the game character in the current acceleration operation according to the historical somatosensory data comprises:

S110: Calculate an average speed according to a speed parameter in the historical somatosensory data.

Specifically, the somatosensory data sent by the somatosensory device to the terminal includes a speed parameter. The speed parameter refers to a speed value at each collection moment, and the user's average speed in a historical time period can be calculated according to the speed parameter.

S220: Determine the running speed of the game character in the current acceleration operation according to the average speed.

Specifically, after calculating the average speed of the user in the historical time, the running speed of the game character in the current acceleration operation may be determined according to the average speed. Specifically, an average speed-running speed correspondence table or correspondence expression is preset in the game, and the terminal may obtain the running speed in the current acceleration operation according to the above correspondence table or correspondence expression after obtaining the average speed.

It can be understood that through the above operations, the user's actual exercise performance can be associated with the running speed in the acceleration operation, so that the user's enthusiasm for exercise can be stimulated, thereby enhancing the user's sense of participation in the game.

In some embodiments, calculating the speed parameter in the historical somatosensory data to calculate the average speed of the user within a preset time window comprises:

S111, performing a deletion operation on the historical somatosensory data to delete a maximum speed parameter and a minimum speed parameter; and

S112, calculating the average speed according to the historical somatosensory data after the deletion operation is performed.

It can be understood that error data in the historical somatosensory data can be reduced by deleting the maximum speed and minimum speed parameters in the historical somatosensory data, so that the historical somatosensory data used can be closer to the user's actual exercise performance, and then the calculated average speed is closer to the user's actual exercise performance, improving the accuracy and authenticity of the obtained average speed.

In some embodiments, the operation button further comprises a prop throwing button, and the method further comprises:

if operation data of the throwing button is received from the somatosensory device, performing a set acceleration operation.

Specifically, the prop throwing button is a button corresponding to a prop throwing function, and based on the prop throwing button, the user can input an prop throwing instruction to implement the operation of prop throwing. It is worth noting that, in the current running-type somatosensory game, props that can be thrown by the prop throwing button include but are not limited to negative gain props, positive gain props, specific level pass props (such as bridges, escalators, etc.), etc.

It can be understood that the operability of the running-type somatosensory game can be increased by using the prop throwing button, and it can help to enrich the content of the game, so as to enhance the fun of the game.

Figure 5:
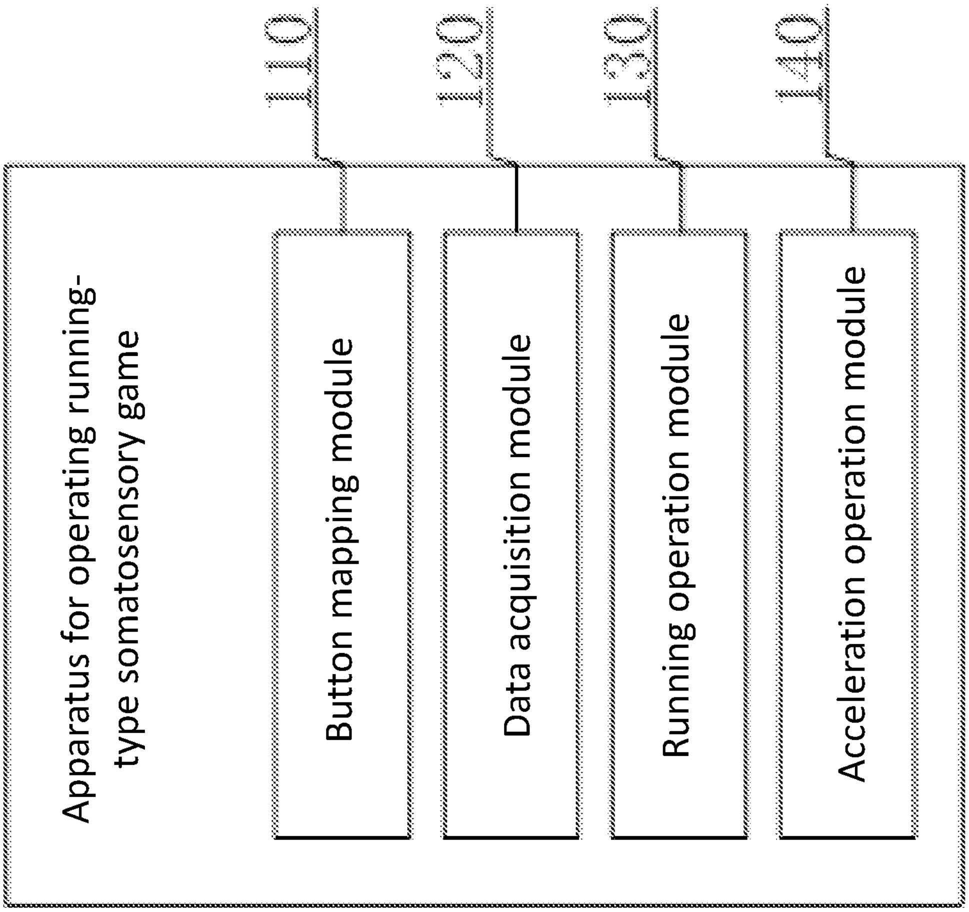
FIG. 5 is a module structural diagram of an apparatus for operating a running-type somatosensory game according to an embodiment of the present disclosure.

In addition, referring to FIG. 5, an embodiment of the present disclosure also proposes an apparatus for operating a running-type somatosensory game, and the apparatus for operating the running-type somatosensory game comprises:

a button mapping module 110 configured to, after a preset running-type somatosensory game is started, map an operation button on a touch display of a paired somatosensory device, the operation button comprising an acceleration button;

a data acquisition module 120 configured to acquire somatosensory data and button operation data from the somatosensory device;

a running operation module 130 configured to perform a running operation according to the somatosensory data, and to accumulate acceleration energy according to the somatosensory data; and an acceleration operation module 140 configured to, when the acceleration energy reaches a set value, if operation data of the acceleration button is received from the somatosensory device, perform an acceleration operation.

For the steps implemented by functional modules of the apparatus for operating the running-type somatosensory game, reference may be made to the various embodiments of the method for operating the running-type somatosensory game of the present disclosure, and they will not be repeated here.

In addition, an embodiment of the present disclosure also proposes a computer-readable storage medium, which may be any one of or any combination of a hard disk, a multimedia card, an SD card, a flash memory card, an SMC, a read-only memory (ROM), an erasable programmable read-only memory (EPROM), a portable compact disk read-only memory (CD-ROM), a USB memory, etc. The computer-readable storage medium comprises the operating program 10 of the running-type somatosensory game. Specific implementations of the computer-readable storage medium of the present disclosure are substantially the same as those of the above method for operating the running-type somatosensory game and the server 1, and they will not be repeated here.

It should be understood by those skilled in the art that the embodiments of the present disclosure may be provided as methods, systems, or computer program products. Therefore, the present disclosure can take the form of an entirely hardware embodiment, an entirely software embodiment, or an embodiment combining software and hardware aspects. Furthermore, the present disclosure may take the form of a computer program product embodied on one or more computer-usable storage media (including but not limited to disk storage, CD-ROM, optical storage, etc.) having computer-usable program code embodied therein.

The present disclosure is described with reference to flowcharts and/or block diagrams of methods, devices (systems), and computer program products according to embodiments of the disclosure. It should be understood that each procedure and/or block in the flowcharts and/or block diagrams, and combinations of procedures and/or blocks in the flowcharts and/or block diagrams can be implemented by computer program instructions.

These computer program instructions may be supplied to a general purpose computer, a special purpose computer, an embedded processor, or a processor of other programmable data processing equipment to produce a machine, so that the instructions executed by the computer or the processor of other programmable data processing equipment produce means for implementing the function(s) specified in one or more steps of the flowcharts and/or one or more blocks of the block diagrams.

These computer program instructions may also be stored in a computer-readable memory capable of directing a computer or other programmable data processing equipment to operate in a specific manner, so that the instructions stored in the computer-readable memory produce an article of manufacture comprising instruction means. The instruction means implement the function(s) specified in one or more procedures of the flowcharts and/or one or more blocks of the block diagrams.

These computer program instructions may also be loaded onto a computer or other programmable data processing equipment, causing a series of operation steps to be performed on the computer or other programmable equipment to produce a computer-implemented process, so that the instructions executed on the computer or other programmable equipment provide steps for implementing the function(s) specified in one or more procedures of the flowcharts and/or one or more blocks of the block diagrams.

While preferred embodiments of the present disclosure have been described, additional changes and modifications to these embodiments can be made by those skilled in the art once they are aware of basic inventive concepts. Therefore, it is intended that the appended claims be construed to cover the preferred embodiment as well as all changes and modifications which fall within the scope of the present disclosure.

Obviously, those skilled in the art can make various changes and modifications to the present disclosure without departing from the spirit and scope of the present disclosure. Thus, if these modifications and variations of the present disclosure fall within the scope of the claims of the present disclosure and equivalent technologies thereof, the present disclosure is also intended to comprise these modifications and variations.

What is claimed is:

1. A method, comprising:

showing an operation button on a touch display of a somatosensory device, the operation button comprising an acceleration button;

acquiring somatosensory data and button operation data from the somatosensory device;

performing a running operation based on the somatosensory data, and accumulating acceleration energy based on the somatosensory data; and when the acceleration energy reaches a set value, and the button operation data indicate that the acceleration button is operated, performing an acceleration operation;

wherein accumulating the acceleration energy based on the somatosensory data comprises:

calculating a number of arm swings of a user based on the somatosensory data; and accumulating the acceleration energy based on the number of arm swings.

2. The method of claim 1, further comprising:

before performing the acceleration operation, determining a running speed of a game character in a current acceleration operation according to historical somatosensory data.

3. The method of claim 2, wherein the historical somatosensory data is somatosensory data during a period when the acceleration energy is accumulated from 0 to a set value.

4. The method of claim 2, wherein determining the running speed of the game character in the current acceleration operation according to the historical somatosensory data comprises:

calculating an average speed according to a speed parameter in the historical somatosensory data; and determining the running speed of the game character in the current acceleration operation according to the average speed.

5. The method of claim 4, wherein calculating the average speed according to the speed parameter in the historical somatosensory data comprises:

removing a maximum speed and a minimum speed from the historical somatosensory data; and calculating the average speed according to the historical somatosensory data without the maximum speed and the minimum speed.

6. The method of claim 1, wherein the operation button further comprises a prop throwing button, and the method further comprises:

when the button operation data indicate that the prop throwing button is operated, performing a set acceleration operation.

7. A non-transitory computer-readable storage medium having instructions recorded thereon, the instructions when executed by a computer implementing the method of claim 1.

8. A computer system comprising the non-transitory computer-readable storage medium of claim 7, a processor and the somatosensory device.

9. A method, comprising:

showing an operation button on a touch display of a somatosensory device, the operation button comprising an acceleration button;

acquiring somatosensory data and button operation data from the somatosensory device;

performing a running operation based on the somatosensory data, and accumulating acceleration energy based on the somatosensory data; and when the acceleration energy reaches a set value, and the button operation data indicate that the acceleration button is operated, performing an acceleration operation;

wherein the operation button further comprises a prop throwing button, and the method further comprises:

when the button operation data indicate that the prop throwing button is operated, performing a set acceleration operation.

10. The method of claim 9, further comprising:

before performing the acceleration operation, determining a running speed of a game character in a current acceleration operation according to historical somatosensory data.

11. The method of claim 10, wherein the historical somatosensory data is somatosensory data during a period when the acceleration energy is accumulated from 0 to a set value.

12. The method of claim 10, wherein determining the running speed of the game character in the current acceleration operation according to the historical somatosensory data comprises:

calculating an average speed according to a speed parameter in the historical somatosensory data; and determining the running speed of the game character in the current acceleration operation according to the average speed.

13. The method of claim 12, wherein calculating the average speed according to the speed parameter in the historical somatosensory data comprises:

removing a maximum speed and a minimum speed from the historical somatosensory data; and calculating the average speed according to the historical somatosensory data without the maximum speed and the minimum speed.

14. A non-transitory computer-readable storage medium having instructions recorded thereon, the instructions when executed by a computer implementing the method of claim 9.

15. A computer system comprising the non-transitory computer-readable storage medium of claim 14, a processor and the somatosensory device.

16. A method, comprising:

showing an operation button on a touch display of a somatosensory device, the operation button comprising an acceleration button;

acquiring somatosensory data and button operation data from the somatosensory device;

performing a running operation based on the somatosensory data, and accumulating acceleration energy based on the somatosensory data; and determining a running speed of a game character in a current acceleration operation according to historical somatosensory data;

when the acceleration energy reaches a set value, and the button operation data indicate that the acceleration button is operated, performing an acceleration operation.

17. The method of claim 16, wherein the historical somatosensory data is somatosensory data during a period when the acceleration energy is accumulated from 0 to a set value.

18. The method of claim 16, wherein determining the running speed of the game character in the current acceleration operation according to the historical somatosensory data comprises:

calculating an average speed according to a speed parameter in the historical somatosensory data; and determining the running speed of the game character in the current acceleration operation according to the average speed.

19. The method of claim 18, wherein calculating the average speed according to the speed parameter in the historical somatosensory data comprises:

removing a maximum speed and a minimum speed from the historical somatosensory data; and calculating the average speed according to the historical somatosensory data without the maximum speed and the minimum speed.

20. A non-transitory computer-readable storage medium having instructions recorded thereon, the instructions when executed by a computer implementing the method of claim 16.

21. A computer system comprising the non-transitory computer-readable storage medium of claim 20, a processor and the somatosensory device.

* * * * *